United States Patent
Ruckert

(10) Patent No.: US 9,914,665 B2
(45) Date of Patent: Mar. 13, 2018

(54) METHOD FOR PRODUCING GRANULATES

(71) Applicant: S & B INDUSTRIAL MINERALS GmbH, Oberhausen (DE)

(72) Inventor: Wolfgang Ruckert, Dusseldorf (DE)

(73) Assignee: S & B Industrial Minerals GmbH, Oberhausen (DE)

( * ) Notice: Subject to any disclaimer, the term of this patent is extended or adjusted under 35 U.S.C. 154(b) by 134 days.

(21) Appl. No.: 14/901,605

(22) PCT Filed: Apr. 25, 2014

(86) PCT No.: PCT/EP2014/058493
§ 371 (c)(1),
(2) Date: Dec. 28, 2015

(87) PCT Pub. No.: WO2014/206598
PCT Pub. Date: Dec. 31, 2014

(65) Prior Publication Data
US 2016/0297712 A1    Oct. 13, 2016

(30) Foreign Application Priority Data

Jun. 28, 2013  (DE) .................. 10 2013 106 832

(51) Int. Cl.
*C04B 35/06* (2006.01)
*C04B 35/626* (2006.01)
(Continued)

(52) U.S. Cl.
CPC ............ *C04B 35/06* (2013.01); *B22D 11/111* (2013.01); *C04B 35/62695* (2013.01);
(Continued)

(58) Field of Classification Search
None
See application file for complete search history.

(56) References Cited

U.S. PATENT DOCUMENTS 1,842,186 A * 1/1932 McBerty .................. C04B 38/02
264/43
4,127,407 A * 11/1978 Eitel ........................ B22D 1/00
75/305

(Continued)

FOREIGN PATENT DOCUMENTS

DE    41 05 178 A1    11/1991
DE    197 31 653 A1   1/1999
(Continued)

OTHER PUBLICATIONS

Translation of EP 2060640.*

*Primary Examiner* — Mary Lynn F Theisen
(74) *Attorney, Agent, or Firm* — Finnegan, Henderson, Farabow, Garrett & Dunner LLP

(57) ABSTRACT

A method for producing granulates, particularly for use as thermal insulation for a metal melt may include mixing a powdery mineral with a binder, and the mixture may be granulated in order to produce a semi-finished product. The granulate mixture or the semi-finished product may be heated rapidly to a temperature above the melting temperature or decomposition temperature of the binder, which may be in the form of a salt, so that the binder decomposes, whereby gas is released and the volume increases. The apparent density of the granulate mixture may decrease, and therefore the apparent density of the finished product may decrease with respect to the semi-finished product.

17 Claims, 2 Drawing Sheets

Figure 1:
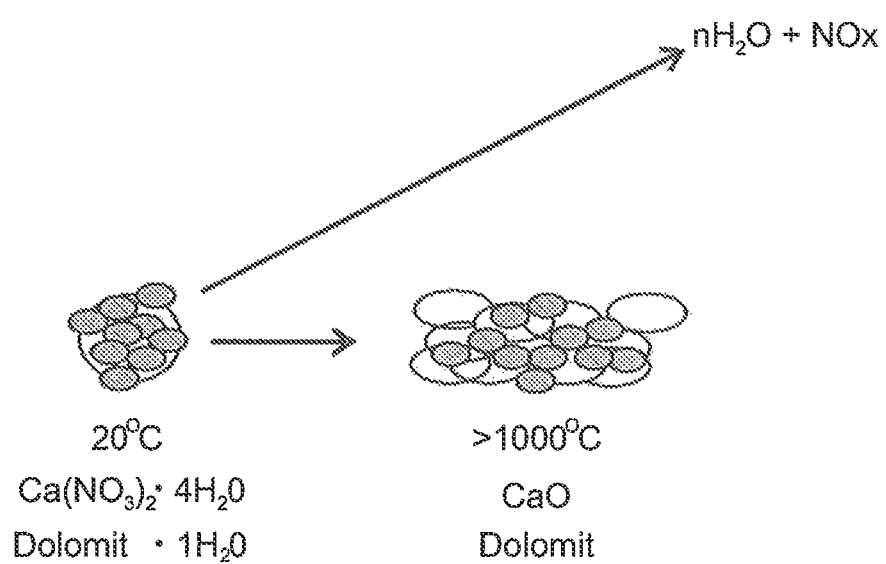

(51) Int. Cl.
*C04B 35/63* (2006.01)
*B22D 11/111* (2006.01)
*C04B 38/02* (2006.01)
*C04B 111/00* (2006.01)

(52) U.S. Cl.
CPC .......... *C04B 35/6303* (2013.01); *C04B 38/02* (2013.01); *C04B 2111/0087* (2013.01); *C04B 2235/321* (2013.01); *C04B 2235/3206* (2013.01); *C04B 2235/3208* (2013.01); *C04B 2235/443* (2013.01); *C04B 2235/6562* (2013.01); *C04B 2235/77* (2013.01)

(56) References Cited

U.S. PATENT DOCUMENTS

| | | | | |
|---|---|---|---|---|
| 4,769,189 A | * | 9/1988 | Douden | C04B 18/027 264/15 |
| 5,876,482 A | * | 3/1999 | Debiesme | B22D 11/111 148/541 |
| 2005/0230659 A1 | * | 10/2005 | Hampden-Smith | C01B 3/326 252/189 |
| 2015/0082944 A1 | * | 3/2015 | Ruckert | C04B 32/005 75/313 |

FOREIGN PATENT DOCUMENTS

| | | |
|---|---|---|
| EP | 0 572 399 B1 | 1/1998 |
| EP | 2 060 640 A1 | 5/2009 |
| WO | WO 2014/206598 A1 | 12/2014 |

* cited by examiner

METHOD FOR PRODUCING GRANULATES

CLAIM FOR PRIORITY

This application is a U.S. national phase entry under 35 U.S.C. § 371 from PCT International Application No. PCT/EP2014/058493, filed Apr. 25, 2014, which claims the benefit of priority of German Patent Application No. 10 2013 106 832.4, filed Jun. 28, 2013, the subject matter of both of which is incorporated herein by reference.

The invention relates to a method for producing granules, in particular for use as thermal insulation for a molten metal and preferably for molten steel, according to which a powdered solid and/or a powdered raw mineral material is mixed with a binder and/or an additive or additive mixture, and the mixture is granulated to form a semifinished product.

To protect molten metal from heat loss and to ensure an adequate metal quality, typically powders or granules are applied to the surface of the molten metal and/or the steel surface. The thermal insulation is generally achieved by means of a low bulk density of the thermal insulation material. In fact, such thermal insulation materials are used in particular after production of steel, to protect the molten steel from any heat loss on its path through the various production stages.

When used on molten metal, which can generally have very high temperatures of more than 1500° C., however, it is important not only to keep any heat losses by the molten metal and/or the molten steel as low as possible, but instead the granules, applied as thermal insulation to the molten metal at this location, or the covering material in general may also be utilized to absorb contaminants from the molten metal. In absorbing contaminants, e.g., aluminum oxide, the covering material may partially melt as a result of a change in its chemical composition. However, the covering material need not melt completely to lose its thermal insulating effect and to prevent caking on the technical plants for metal production.

In addition, another requirement is that such covering materials should not be harmful to health or to the environment. In this regard, the fines content of the grain size range must be minimized, and furthermore, the underlying raw materials need not be classified as harmful to health.

Modern raw materials used in the industry are often granulated to allow them to be conveyed automatically.

A particularly good thermal insulation effect would make it possible to reduce the consumption of raw materials during production of metal and to save on global resources because less material would be required for the purpose of thermal insulation.

One such method is described in DE 197 31 653 C2, which relates to a method for producing beads or pellets of rice husk ash, which are used as thermal insulation material and consequently as a covering material for a metal melt. The thermal insulation material is used as thermal insulation for molten steel. Such thermal insulation materials are actually used following steel production in particular to protect the molten steel from possible heat loss on its path through the various production stages. To this end, such granules are typically applied as a covering material to the surface of the molten metal and/or to the steel surface.

At this point, it is not only important to minimize possible heat losses by the molten metal and/or the molten steel but also the covering material should shield the molten steel or molten metal in general from atmospheric gases and prevent unwanted chemical reactions in the molten metal. Furthermore, as an additional requirement, such covering materials should not be harmful to health and/or harmful to the environment.

According to DE 197 31 653 C2, there is a problem here with the rice husk ash used, inasmuch as the rice husk ash can react with components of the liquid metal. Namely there can be reactions with metallic aluminum dissolved in molten steel having a high silicic acid content. Quite apart from this, there is the risk with the prior art that the rice husk ash formed as amorphous silicon dioxide might enter the human body as fine dust particles, which under some circumstances may cause silicosis. This means that within the context of DE 197 31 653 C2, it is possible to prevent beads or pellets from being used.

EP 1 572 399 B1 relates to a covering material and/or covering material for covering the free surface of a molten steel bath in an open metallurgical vessel. The covering material is used in particular in steel production in the field of pig iron and secondary metallurgy and in continuous casting, where it forms a so-called top slag. Porous granules with grains having a porosity of 5 to 70 vol % are used. The granules are made of calcium aluminates. This should ensure a simpler thermal insulation on the whole.

Finally, EP 2 573 058, A1 which is also to be taken into account and also establishes the generic type, relates to granules containing at least one agglomerated reactive bulk material as well as a binder matrix. The binder matrix is comprised of at least one organic or inorganic salt as the binder. Agglomeration should be achieved in this way without the aid of water and while avoiding high temperatures.

The prior art cannot be convincing in all aspects. For example, health risks of the covering materials and/or granules still cannot be ruled out. Furthermore, environmental risks cannot be prevented and processing of the known covering materials is problematical in some cases. This is where the present invention intends to create a remedy.

The invention is based on the technical problem of improving upon such a method for producing granules, so that granules that do not present a health risk are made available; these granules are unreactive and can be processed easily.

To solve this technical problem, a generic method for producing granules within the context of the present invention is characterized in that the granular mixture and/or the respective semifinished product is heated suddenly to a temperature above the melting temperature of the binder, which is formed as a salt, so that the binder, which is subsequently in a molten state, decomposes at least partially with the release of gas and an increase in volume. The bulk density of the granular mixture and consequently of the finished products produced in this way therefore declines in comparison with that of the semifinished product not treated with heat. The release of gas from the binder leads to an increase in volume, i.e., expansion of the binder, and consequently, expansion of the semifinished product, which thereby becomes a finished product.

The powdered ingredients of the solids are held together with the help of the binder and form the desired granules. Therefore, the bulk density of the granular mixture and thus the bulk density of the finished product produced from the granules declines on the whole in this way in comparison with that of the semifinished product.

The sudden heating of the semifinished product and/or the mixture of the powdered solids and the binder and consequently the granular mixture may take place in general with a temperature gradient of at least 20° C./sec. In other words, the semifinished product is heated in a furnace, so that the increase in temperature reported above and/or the associated temperature gradient is observed with the individual granules. A rotary furnace and/or a rotary kiln, such as those known from slaking lime and described in DE 580 572, among others, may be used as a suitable furnace.

According to the invention, the process is carried out at a temperature equal to the final temperature of the semifinished product, which is higher than the melting temperature of the binder and preferably even higher than the decomposition temperature of the binder, which is embodied as a salt. Calcium nitrate tetrahydrate or magnesium nitrate decahydrate is preferably used as the salt, as described in greater detail below.

The melting point of calcium nitrate tetrahydrate, i.e., the melting temperature, is approximately 45° C., while anhydrous calcium nitrate has a melting temperature of approximately 560° C. Thermal decomposition of calcium nitrate takes place in various stages. First, the water of crystallization of the tetrahydrate is split off at temperatures of <100° C. Oxygen begins to split off at temperatures above 130° C. Calcium nitrate begins to decompose at temperatures above 225° C.

At any rate, in the example of calcium nitrate as the binder, the semifinished product is heated suddenly from room temperature (approximately 20° C.) to a temperature above the melting temperature, i.e., higher than 45° C. for the tetrahydrate (calcium nitrate tetrahydrate). This sudden heating can also take place up to temperatures above the decomposition temperature as the final temperature, i.e., in the present case, up to a temperature of more than 225° C. In both cases, the semifinished product is heated suddenly from room temperature (20° C.) to the melting temperature (45° C.) and/or the decomposition temperature (approximately 225° C.) as the lower limit, i.e., with a temperature gradient of at least 20° C./sec. In other words, the temperature of the semifinished product and/or of the individual granules and/or of the granular grains increases at the rate of at least 20° C./sec.

The actual heating process can take place by heat transfer in the rotary furnace and/or rotary kiln described above. In general, however, the sudden heating of the semifinished product takes place by means of radiant heat in a non-contact process. In this case, the granules of the semifinished product typically pass through a heating zone, where they are exposed to a corresponding temperature, so that the aforementioned temperature gradient is also observed in the transition from the semifinished product to the finished product and the final temperature in the finished product. For example, the granules can be passed through a heated tube made of ceramic, for example, to create the aforementioned conditions.

In doing so, this will typically work in such a way that the granules of the semifinished product fall vertically through the tube and/or along the heating zone due to their inherent weight and are at least partially decelerated with the help of an airstream directed in the opposite direction to intensify the heating effect. As already explained, the sudden heating in this case takes place without contact, namely based on the radiant heat emitted by the tube.

The reduction in bulk density can be attributed essentially to the fact that the binder and/or the additive create(s) pores in the finished product due to the release of gas in the mixture. The formation of pores may also be facilitated by the water of crystallization released primarily from the binder during heating. In other words, expansion of the binder in combination with the water thereby released results in a significant increase in the porosity and also the volume of the granules in the transition of the semifinished product and/or the corresponding granules to the finished product, and the expansion of the binder in combination with the water thereby released results in an inflation of the size of the granules comparable to the "popcorn effect."

Moreover, possible residues from decomposition of the binder and/or the additive also ensure that the finished product is stabilized. In fact, at least 90% by weight of the binder is usually decomposed. In other words, the finished product contains 10% by weight or less binder in comparison with the semifinished product.

The binder and/or the decomposed binder and/or its gaseous decomposition products, respectively, can be carried in circulation on the whole. In other words, the liquid ingredients of the binder can be at least mostly reused. The invention proposes here that an exhaust gas purification be performed. In fact, the nitrogen oxides that are mostly formed during the decomposition of the binder and are to be separated can be separated in a gas purification plant, such as that described in principle in DE 42 16 772 A1. In the present case of using calcium nitrate as the binder, the exhaust gas purification can be performed in such a way that the nitrogen oxides and/or nitrogen dioxide and/or nitric acid thereby formed is/are bound with calcium hydroxide powder to form calcium nitrate.

The calcium nitrate from the exhaust gas can be added back to the process according to the invention as a binder. Consequently, the binder is at least partially recirculated. To do so, the gaseous ingredients of the binder are deposited following the sudden heating of the semifinished product as part of exhaust gas purification and can be supplied as a binder again.

The granules are thus used first as a feedstock within the context of the invention, i.e., as granular mixtures, in which the grain size is greater than 0.2 mm, which is advantageous for the semifinished products. It has proven favorable for the average grain size of the semifinished product and/or its granular mixture to be in the range of approximately 0.5 mm to 1.8 mm. On the other hand, an average grain size of the granules of at least 0.2 mm has been observed for the finished products. The grain size of the granules of the finished product is especially preferably in the range of approximately 0.5 mm to 2 mm. The decrease in bulk density of the granular mixture of the finished product in comparison with that of the semifinished product, which has already been described, is associated with the increase of at least approximately 10% or more in the average grain size in the finished product in comparison with the semifinished product.

In fact, bulk density values in the range of 1.0 kg/dm$^3$ to 1.5 kg/dm$^3$ and preferably in the range of approximately 1.2 kg/dm$^3$ have been observed with the semifinished product and before the sudden heating process used according to the invention. As an alternative to this, the bulk density values may also be given in units of t/m$^3$ instead of units of kg/dm$^3$, as already one in the introduction. Bulk density values that are typically in the range of 0.8 kg/dm$^3$ or less are observed after the heating process and for the finished product. In fact, the bulk density of the finished product may also be set at values of less than 0.5 kg/dm$^3$ and in particular at values of 0.3 kg/dm$^3$ or less. This is possible essentially with the help of the sudden heating process and/or the temperature gradient actually set for this is primarily considered responsible.

As a rule, the granular mixture and consequently the semifinished product will be exposed to a temperature gradient of at least 50° C./sec, in particular 70° C./sec and most especially preferably a temperature gradient of at least 100° C./sec. The higher the temperature gradient, the lower is the bulk density or bulk weight of the finished product produced in this way. In other words, the bulk density observed at the output end in the finished product thereby produced is predetermined and set with the help of the temperature gradient in the sudden heating of the semifinished product. The greater the temperature gradient, the greater is the reduction in bulk density of the finished product in comparison with the semifinished product. As a rule, a decline of at least 20% in the bulk density of the finished product in comparison with the semifinished product is observed.

The binder mixed with the powdered mineral and/or solid is also usually in powdered form and is dissolved in a solvent such as water. In other words, the powdered binder is generally mixed with the powdered mineral and/or solid with the addition of the solvent in question such as water, for example, and the mixture is then granulated, producing the semifinished product and/or the granular mixture.

The granulation process can take place, for example, by disk granulation. An intermediate extrusion process is also possible as long as the desired agglomerates and/or grains of semifinished product are present at the output end in the stated average grain size in the range of 0.5 mm to 1.8 mm. Any drying process can also be incorporated into the production of the semifinished product. However, one deciding factor is that the semifinished product and/or the respective agglomerates or grains contain bound water. Typically moisture contents in the range of 5% by weight to 30% by weight and at most 10% by weight to 30% by weight, typically 16% by weight to 22% by weight are observed in the semifinished product. However, the finished product has a moisture content of at least less than 4% by weight.

The set temperature and/or the melting temperature in the subsequent sudden heating of the semifinished product for production of the finished product with such a binder having a moisture content equal to or above a separation temperature of the solvent and/or the water in the example of the granular mixture preferably occurs or is generally at such a temperature. In this case, the separation temperature corresponds to the boiling temperature of the solvent, which is thus approximately 100° C. (at normal pressure) in the case of water. In other words, the (final) temperature set for the sudden heating process above the melting temperature of the binder, which is in the form of salt, is such that both the melting temperature of the binder and the separation temperature and/or the boiling temperature of the solvent from the granular mixture is/are both exceeded.

As a rule, the (final) temperature in the sudden heating process is not only above the melting temperature of the binder embodied as a salt but is preferably also above the decomposition temperature of the binder embodied as a salt. This is fundamentally true, i.e., it is also true of a binder having little or no moisture content. In this way, the solid decomposition residues of the binder can manifest a binding effect in the finished product. The decomposition products thus function as a builder structure in the finished product.

Furthermore, the water of crystallization bound in the binder and consequently also in the semifinished product is split off at the same time during heating to the temperature in question and/or the (final) temperature far above the decomposition temperature of the salt. Water vapor is therefore released. Furthermore, nitrogen oxides are generally released because the binder, which is embodied as a salt, is typically an organic and/or inorganic (nitrogenous) salt. In fact, binders and/or salts such as calcium nitrate tetrahydrate or magnesium nitrate decahydrate have proven to be especially favorable here.

Calcium nitrate is known to be the calcium salt of nitric acid. On the other hand, magnesium nitrate is the magnesium salt of nitric acid. Therefore, salts and preferably nitrate salts, which are characterized by a significant release of nitrogen oxides in their decomposition, are used as binders and as additives at the same time.

In other words, in the sudden heating process used according to the invention, with the stated temperature gradient of at least 20° C. per second, not only is the water of crystallization bound in the binder or the solvent in general released by evaporation but instead nitrogen oxides are also released in this exemplary case. Both of these gases ensure that the binder will foam as it decomposes, so the result is a definite reduction in the bulk density of the semifinished product in the transition to the finished product, as described above.

A furnace, for example, a so-called perlite furnace, is used in most cases to further intensify the heating process. The granular mixture and/or the semifinished product is treated with a stream of hot air, i.e., without contact. It has proven especially favorable here if the heating process is carried out as a countercurrent process, i.e., if the granular mixture and/or the semifinished product passes in countercurrent through the hot air stream produced in the furnace, so that particularly intense and uniform heating of the individual granules is observed. As an alternative, however, a vertical ceramic furnace may also be used. In both cases, the temperatures of the hot air stream, which usually exceed 600° C. or even more, can be set and observed in the interior.

In fact, the decomposition temperature of magnesium nitrate, for example, is approximately 330° C. In the case of magnesium nitrate, the water of crystallization is released at temperatures above 90° C. Decomposition beginning at temperatures higher than 225° C. has been observed with calcium nitrate. The water of crystallization of the tetrahydrate is split off at temperatures higher than 100° C.

As soon as temperatures of 600° C. and optionally higher are achieved in heating the semifinished product in the exemplary case, it is ensured that, when using calcium nitrate and magnesium nitrate as the respective binders in the semifinished product, not only will the water of crystallization in those materials be split off but there will also be decomposition, namely with the release of nitrogen oxides. Therefore, the decline in bulk density already described is observed. In fact, release of the gases in question, i.e., the water vapor and the nitrogen oxides in the example in question takes place suddenly because the process of heating from room temperature (20° C.), for example, to temperatures above the decomposition temperature of 600° C. occur in a short period of time which is usually less than 10 sec. In most cases, periods of time of only 2 sec are observed here, so that in this case a temperature gradient of almost 300° C./sec is observed.

The powdered solids used here, in particular the mineral and/or powdered raw mineral material that is usually used for producing the granules according to the invention is generally calcium oxide, magnesium oxide, calcium magnesium oxide (calcined dolomite), dolomitic lime, aluminum oxide, dunite, forsterite, olivine, carbon or comparable materials. It is crucial that the melting temperature of the powdered mineral and/or of the solid is substantially above the decomposition temperature of the binder and is also above the separation temperature of the solvent for the binder.

Otherwise, after decomposition of the binder and splitting off the water of crystallization from the binder, the powdered mineral cannot ensure the desired and required formation and stability of grains in the finished product. For example, calcium oxide as a possible powdered mineral to be used has a melting temperature, which is more than 2500° C. In comparison with the decomposition temperature of calcium nitrate as a possible binder of less than 400° C. and/or approximately 225° C., a temperature interval of approximately 2000° C. is observed here between the melting temperature of the powdered mineral in comparison with the binder. In general, however, temperature differences of 500° C. or more between the decomposition temperature of the binder, on the one hand, and the melting temperature of the powdered mineral, on the other hand, are sufficient for the applications that have been described. In particular a temperature difference of 100° C. or more is completely adequate here. In other words, the melting temperature of the powdered solid is above the melting temperature and even above the decomposition temperature of the binder. In this case, temperature differences of 100° C. or more have proven to be favorable.

The powdered mineral is therefore still capable of making available a stable basic structure for the granules of the finished product, namely also taking into account the definite reduction in the bulk density, which can drop from 1.2 kg/dm$^3$ to 0.5 kg/dm$^3$ or even less, as already explained. On the whole, and in addition to this, it is assumed here that the melting temperature and/or the decomposition temperature of the binder embodied as a salt will always be higher than the separation temperature of the solvent from the binder and/or from the granular mixture. In the examples described here this is the case because the separation temperature of the solvent, i.e., water that is generally used is in the range of 90° C. to 100° C., whereas the melting temperature and/or the decomposition temperature of the binder can assume values of up to approximately 200° C. to approximately 330° C.

Furthermore, the design is usually such that the amount of binder and/or additive in the semifinished product is less than 50% by weight. Consequently, the powdered mineral in the semifinished product amounts to 50% by weight or more. Mixtures, in which 20% by weight to 40% by weight binder and/or additive is used and the rest is the powdered mineral, have proven to be especially suitable in the semifinished product. As the lower limit for the binder and/or the additive in the semifinished product, the present invention recommends 5% by weight of binder, because otherwise the required mechanical stability of the finished product produced from the semifinished product cannot be ensured. The powdered solid is present in an amount of more than 60% by weight in the semifinished product. The binder accounts for the rest (except for any contaminants or possible aggregates, but they would not amount to more than 5% by weight).

For aluminum oxide as the solid, a melting temperature of more than 2000° C. is generally observed, but this is also significantly higher than the decomposition temperatures of magnesium nitrate, on the one hand, and calcium nitrate, on the other hand, as conceivable binders. The situation is similar for dolomitic lime or dolomite in general, which has a melting temperature significantly above 450° C. The difference between the melting temperature of the powdered mineral (>450° C.) and that of the binder (approximately 330° C.) again amounts to 100° C. or more in this case.

Production of the semifinished product from the powdered mineral, the binder and optionally the solvent for the binder can fundamentally take place in two ways. Within the scope of a first alternative, it is conceivable for the powdered mineral and the binder to each be dry-mixed in powdered form and then for the solvent to be added before a granulation process takes place and/or agglomerates are produced. The term "powdered" in this context refers to loose materials with an average grain size substantially less than 0.5 mm. Average grain sizes of 200 µm or less are observed in most cases.

However, as an alternative to preparing a dry mixture and then adding solvents, it is also conceivable and within the scope of the invention for the powdered material, on the one hand, and the binder, which is dissolved in the solvent, on the other hand, to be prepared in moist form. In both cases, the moisture content of the semifinished granulated product subsequently produced is between approximately 5% by weight and 30% by weight.

Exemplary Embodiment

The invention recommends the use of approximately 60% by weight powdered mineral and approximately 40% by weight binder as a possible composition for producing the semifinished product and/or the corresponding granules of semifinished product. In other words, the semifinished product contains more than 60% by weight of the powdered mineral and the remainder consists predominantly of the binder, i.e., except for some soiling, residual substances, etc. For example, the bulk density is in the range of 1.2 kg/dm$^3$ when 66% by weight hydrated dolomitic lime and 33% by weight calcium nitrate tetrahydrate are used to produce the semifinished product as described.

After heating, bulk densities of the finished product, which are typically 0.5 kg/dm$^3$ or lower, are obtained. The finished product consists of 91% by weight anhydrous dolomitic lime and 6% lime and/or calcium oxide from the decomposition of the calcium nitrate tetrahydrate. In the exemplary case, the product is heated from approximately room temperature (20° C.) to temperatures above the decomposition temperature of 600° C. and in particular to temperatures even higher than 1200° C. within a period of usually less than 10 sec. Depending on the desired bulk density of the finished product, it is also possible to work with a period of less than 2 sec.

Figure 2:
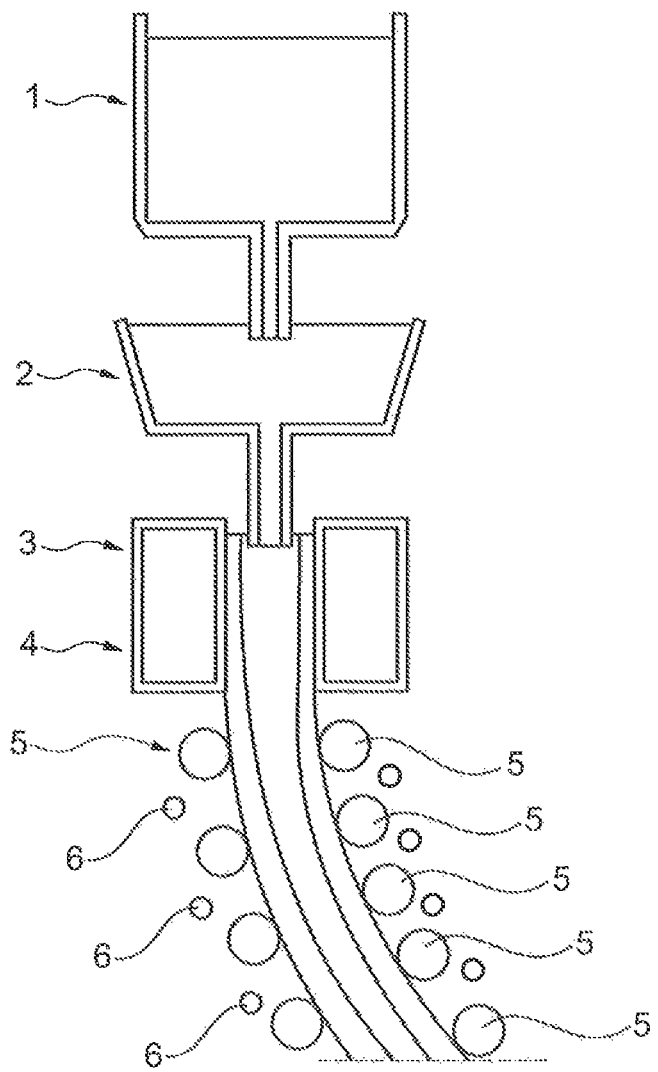

In the accompanying figures:

FIG. 1 shows schematically the production process according to the invention, and FIG. 2 shows the use of the granules thus produced as a covering material for a molten metal.

The production process according to the invention is diagrammed schematically in FIG. 1, where the portion at the left shows the semifinished product at 20° C., consisting of calcium nitrate (Ca (NO$_3$)$_2$.4H$_2$O) and dolomite, each with bound water of crystallization. Water vapor (n H$_2$O), on the one hand, and nitrogen oxides (NO$_x$), on the other hand, are released by the process of sudden heating from 20° C. to temperatures higher than 1000° C., as indicated schematically. The dolomite and the lime, i.e., CaO from decomposition of the binder, therefore remain in the finished product.

FIG. 2 now shows the use of the granules produced by the process according to the invention as a covering material for molten metals in general and in particular for molten steel. This shows first a casting ladle 1, from which the molten metal and/or steel goes into a casting tank, i.e., tundish 2. The molten steel in the tundish 2 is covered on its surface with the help of the covering material according to the invention, so that little or no oxidation can occur at these locations. Starting from the tundish 2, the molten metal and/or steel is cast to form a strand, namely starting from a molding tool 3, which is cooled by water supplied 4 in this exemplary case.

After leaving the molding tool 3, the metal strand thus formed is passed further over supporting rollers 5. Spray nozzles 6 can be placed on each side of the metal strand thus produced between the supporting rollers 5. Water can be sprayed onto the metal surface with the help of these nozzles, for example.

The invention claimed is:

1. A method for producing granules for use as thermal insulation for a molten metal, the method comprising:
    mixing a powdered solid with a binder to form a mixture;
    granulating the mixture to form a semifinished product; and
    heating the semifinished product to a temperature above the melting temperature of the binder, embodied as a salt, wherein the heating causes at least partial decomposition of the binder, a release of a gas, and an increase in a volume of the mixture, and wherein a bulk density of the mixture after heating is less than a bulk density of the semifinished product.

2. The method according to claim 1, wherein the semifinished product is heated to a temperature above a decomposition temperature of the binder.

3. The method according to claim 1, wherein the heating of the semifinished product results in a finished product.

4. The method according to claim 3, wherein a solid decomposition residue of the binder is formed during heating and manifests a binding effect in the finished product.

5. The method according claim 1, wherein the binder is present in a powdered form, and the binder is mixed with the powdered solid with the addition of a solvent before the mixture is granulated.

6. The method according to claim 1, wherein the melting temperature of the binder is equal to or higher than the boiling temperature of the solvent from the granular mixture.

7. The method according to claim 1, wherein an oxide that does not react with the molten metal is used as the powdered solids.

8. The method according to claim 7, wherein the oxide comprises calcium oxide, aluminum oxide, or dolomitic lime.

9. The method according to claim 1, wherein an organic or inorganic salt is used as the binder.

10. The method according to claim 3, characterized in that a grain size of the finished product is greater than 0.2 mm.

11. The method according claim 1, wherein the semifinished product is heated with a temperature gradient of at least 20° C./sec or more.

12. The method according to claim 1, wherein the semifinished product is heated with a temperature gradient of at least 50° C./sec.

13. The method according to claim 1, wherein the semifinished product is heated with a temperature gradient of at least 70° C./sec.

14. The method according to claim 1, wherein the heating of the semifinished product is carried out as a non-contact process.

15. The method according to claim 1, wherein the process of heating is carried out in a furnace.

16. The method according to claim 1, wherein the semifinished product consists essentially of the powdered solid and the binder, and the powdered solid is more than 60% by weight of the semifinished product.

17. The method according to claim 1, characterized in that the gas released by the heating of the semifinished product is separated and used as a binder.

* * * * *